(12) United States Patent
Eaton

(10) Patent No.: US 7,944,548 B2
(45) Date of Patent: May 17, 2011

(54) INCREASING MEASUREMENT RATE IN TIME OF FLIGHT MEASUREMENT APPARATUSES

(75) Inventor: Robert B. Eaton, Littleton, MA (US)

(73) Assignee: Leica Geosystems AG, Heerbrugg (CH)

( * ) Notice: Subject to any disclaimer, the term of this patent is extended or adjusted under 35 U.S.C. 154(b) by 245 days.

(21) Appl. No.: 11/397,246

(22) Filed: Apr. 4, 2006

(65) Prior Publication Data

US 2009/0122295 A1    May 14, 2009

Related U.S. Application Data

(60) Provisional application No. 60/780,167, filed on Mar. 7, 2006.

(51) Int. Cl.
*G01C 3/08* (2006.01)
(52) U.S. Cl. .............. 356/5.01; 356/5.03; 356/5.07
(58) Field of Classification Search .............. 356/5.01
See application file for complete search history.

(56) References Cited

U.S. PATENT DOCUMENTS

| | | | |
|---|---|---|---|
| 3,456,211 A | | 7/1969 | Koester |
| 3,897,150 A | * | 7/1975 | Bridges et al. ........... 356/5.04 |
| 4,234,141 A | * | 11/1980 | Miller et al. ............. 244/3.13 |
| 4,515,431 A | | 5/1985 | Shaw et al. |
| 4,685,107 A | | 8/1987 | Kafka et al. |
| 4,835,778 A | | 5/1989 | Kafka et al. |
| 5,150,125 A | * | 9/1992 | Hager ..................... 342/120 |
| 5,513,194 A | | 4/1996 | Tamura et al. |
| 5,606,413 A | | 2/1997 | Bellus et al. |
| 5,726,657 A | * | 3/1998 | Pergande et al. ......... 342/202 |
| 5,793,034 A | | 8/1998 | Wesolowicz et al. |
| 5,815,250 A | * | 9/1998 | Thomson et al. ......... 356/5.01 |
| 5,835,199 A | | 11/1998 | Phillips et al. |

(Continued)

FOREIGN PATENT DOCUMENTS

CA    2446909    12/2002

(Continued)

OTHER PUBLICATIONS

Hughes E J et al: "Medium PRF Radar PRF Optimization Using Evolutionary Algorithms," Proceedings of the 2003 IEEE Radar Conference, Huntsville, Alabama, (May 5-8, 2003), IEEE, Radar Conference, New York, New York: IEEE US, (May 5, 2003), pp. 192-202.

(Continued)

*Primary Examiner* — Thomas H Tarcza
*Assistant Examiner* — Timothy A Brainard
(74) *Attorney, Agent, or Firm* — Maschoff Gilmore & Israelsen

(57) ABSTRACT

An apparatus for measuring distance to a surface is disclosed. The apparatus transmits at least one subsequent pulse of light prior to receiving a reflection of a previously sent pulse of light. Thus, multiple pulses of light are in-flight at a given time. The embodiments are applicable to terrain mapping, bathymetry, seismology, detecting faults, biomass measurement, wind speed measurement, temperature calculation, traffic speed measurement, military target identification, surface to air rangefinding, high definition survey, close range photogrammetry, atmospheric composition, meteorology, distance measurement, as well as many other applications. Examples of such apparatuses include laser ranging systems, such as light detection and ranging (LIDAR) systems, and laser scanners. Data received from the apparatus by a data processing unit can be used to create a data model, such as a point cloud, digital surface model or digital terrain model describing the surface, terrain, and/or objects.

29 Claims, 2 Drawing Sheets

U.S. PATENT DOCUMENTS

| | | | |
|---|---|---|---|
| 6,023,322 A * | 2/2000 | Bamberger | 356/5.01 |
| 6,094,270 A * | 7/2000 | Uomori et al. | 356/623 |
| 6,359,582 B1 * | 3/2002 | MacAleese et al. | 342/22 |
| 6,664,529 B2 | 12/2003 | Pack et al. | |
| 6,734,849 B2 | 5/2004 | Dimsdale et al. | |
| 6,746,078 B2 * | 6/2004 | Breed | 297/216.12 |
| 6,876,441 B2 | 4/2005 | Barker | |
| 6,963,354 B1 * | 11/2005 | Scheps | 348/31 |
| 2002/0060784 A1 * | 5/2002 | Pack et al. | 356/6 |
| 2002/0198632 A1 * | 12/2002 | Breed et al. | 701/1 |
| 2003/0122420 A1 * | 7/2003 | Tarabishy et al. | 303/191 |
| 2004/0049323 A1 * | 3/2004 | Tijerina et al. | 701/1 |
| 2004/0130702 A1 * | 7/2004 | Jupp et al. | 356/5.01 |
| 2004/0153244 A1 * | 8/2004 | Kellum | 701/301 |
| 2004/0236535 A1 * | 11/2004 | Hyyppa et al. | 702/155 |
| 2006/0238742 A1 * | 10/2006 | Hunt et al. | 356/5.15 |

FOREIGN PATENT DOCUMENTS

| | | |
|---|---|---|
| CA | 2562620 | 4/2010 |
| CN | 200610152833.5 | 10/2009 |
| EP | 1405096 | 4/2004 |
| EP | 1832897 | 9/2007 |
| EP | 06121927.5 | 10/2008 |
| EP | 06121927.5 | 5/2010 |
| EP | 10169727 | 9/2010 |
| JP | 62117535 | 5/1987 |
| JP | 63-008576 | 1/1988 |
| JP | 0348790 | 1/1991 |
| JP | 2004/527765 T | 9/2004 |
| JP | 2006290973 | 8/2009 |
| JP | 2006290973 | 10/2010 |
| WO | 01/31290 | 5/2001 |
| WO | WO02/097367 | 12/2002 |

OTHER PUBLICATIONS

Abshire, James B. Sun, Xiaoli, and Krainak, Michael A., Laser Altimetry Using Pseudo-Noise Code Modulated Fiber Lasers and Photon Counting Detectors, NASA-Goddard Space Flight Center, Laboratory for Terrestrial Physics, Mail Code 920, Greenbelt, MD 20771, (301) 614-6081, 2005 Quantum Electronics and Laser Science Conference (QELS) pp. 1991-1993.

Defense Advanced Research Projects Agency (DARPA) Proposal Request SB052-027, Wavelength Conversion of Pulsed Fiber Lasers, Accessed Oct. 27, 2006 (Available at http://dodsbir.net/solicitation/sbir052/darpa052.doc).

U.S. Appl. No. 11/675,059, mail date Mar. 25, 2008, Office Action.

English-language translation of "Notification of Reasons for Rejection" in Japanese Patent Application No. JP2006-290973, mailed Aug. 25, 2009.

Seppo Nissila and Juha Kostamovaara, *A fibre laser as the pulse source for a laser rangefinder system*, University of Oulu, Department of Electrical Engineering, Electronics laboratory SF-90570 Oulu, Finland, SPIE vol. 1821 (1992)/375, http://spiedl.org/terms (pp. 375-383).

Basm Altaher Moloud Abufela, *Development of Laser Range Finder Using 1550 nm Wavelength*, Thesis Submitted to the School of Graduate Studies, University Putra Malaysia, in Fulfillment of Requirement for the Degree of Master of Science, Oct. 2006, (12 pages).

Hughes E J et al: "Medium PRF radar PRF optimisation using evolutionary algorithms," Proceedings of the 2003 IEEE Radar Conference. Huntsville, AL, May 5-8, 2003, IEEE Radar Conference, New York, NY: IEEE, US, May 5, 2003, pp. 192-202, XP010642662.

European Search Report issued Sep. 2, 2010 in corresponding European Application No. 10 16 9727.

* cited by examiner

INCREASING MEASUREMENT RATE IN TIME OF FLIGHT MEASUREMENT APPARATUSES

CROSS-REFERENCE TO RELATED APPLICATIONS

This application claims the benefit of U.S. Provisional Patent Application No. 60/780,167 filed on Mar. 7, 2006.

BACKGROUND

Light emitting devices, such as lasers, have been used as a sensor component to gather information in various applications. For example, time of flight measurement apparatuses, such as laser scanners and light detection and ranging apparatuses (hereinafter referred to as "LIDAR"), have been used for many applications. Examples of such applications include terrain mapping, bathymetry, seismology, detecting faults, biomass measurement, wind speed measurement, Differential Absorption LIDAR (DIAL), temperature calculation, traffic speed measurement, military target identification, surface to air rangefinding, high definition surveying, close range photogrammetry, atmospheric composition, meteorology, distance measurement, as well as many other applications.

LIDAR has been increasingly used for surveying and topographical mapping of geographical areas, for example, using downward-looking LIDAR instruments mounted in vehicles, such as aircraft or satellites. Such LIDAR instruments are used to determine the distance to a surface, such as a surface of an object or a terrain surface, using pulses of light. The range to the surface is determined by measuring the time delay between transmission of a pulse of light and detection of a corresponding reflection signal. In such systems, speed of light is used as a known constant for calculating the distance using the time of light travel.

Airborne LIDAR systems have been used for direct measurement of ground surfaces and natural and man-made objects from the air. Typically, the data, such as laser range and return signal intensity measurements, is recorded by a LIDAR system in-flight, along with positional and attitude data derived from airborne GPS and inertial subsystems. Data models generated can include high spatial resolution "point clouds" that can also yield details under tree cover and provide "bare earth" terrain models used for orthorectification of aerial imagery (using standardized software packages). As the aircraft flies across the project area, pulses of light are fired toward the ground one after another at a high rate. These pulses of light are reflected by the ground and/or objects upon the ground such as trees and buildings.

Laser scanners are also used to obtain data models describing surfaces, such as surfaces of objects. One example of a laser scanner is disclosed in U.S. Pat. No. 6,734,849, the contents of which are incorporated herein by reference. A laser scanner, such as the laser scanner disclosed in U.S. Pat. No. 6,734,849, can be used to collect points to form a point cloud describing the scanned surface.

According to these conventional embodiments, a subsequent pulse of light is not sent until a return reflection signal from the previous pulse of light is received. For each pulse of light, the elapsed time between the emitted and returning signals is measured, which enables a vertical, or a slant distance, to be computed. The location of the reflective surface can be calculated based on: (1) the angle with respect to the system at which the pulse of light is transmitted, (2) the orientation of the system with respect to the earth and (3) the current location of the system. As the measurements progress, data from such laser firings, often numbering in the millions, can be captured and additional data models describing the reflecting surface can be recorded, providing a dense digital terrain model (DTM) or digital surface model (DSM), for example. However, these conventional embodiments have been limited as to the rate at which pulses of light can be sent and received.

BRIEF SUMMARY OF SEVERAL EXAMPLE EMBODIMENTS

A time of flight measurement apparatus includes a laser configured to transmit light and an optical receiver configured to receive light. The time of flight measurement apparatus further includes laser control circuitry configured to cause the laser to transmit a first pulse of light prior to a second pulse of light. The laser control circuitry is further configured to cause the laser to transmit the second pulse of light prior to a time at which the reflected first pulse of light is received by the optical receiver. The time of flight measurement apparatus further includes elapsed time circuitry configured to measure an elapsed time between transmission of the first pulse of light by the laser and reception of the reflected portion of the first pulse of light by the optical receiver.

A system for collecting information describing terrain is disclosed. The system includes a LIDAR system configured to transmit at least one subsequent pulse of light prior to receiving a reflected portion of a previously emitted pulse of light.

A method for acquiring data describing a surface is disclosed. The method includes transmitting a first pulse of light. The method further includes transmitting a second pulse of light after the first pulse of light is transmitted. The method further includes receiving a reflected portion of the first pulse of light after the second pulse of light is transmitted. The method further includes determining a time of flight of the first pulse of light by determining an elapsed time between the transmission of the first pulse of light and the time of reception of the reflected portion of the first pulse of light.

These and other features of the present invention will become more fully apparent from the following description and appended claims, or may be learned by the practice of the invention as set forth hereinafter.

BRIEF DESCRIPTION OF THE DRAWINGS

To further clarify the above and other features of the present invention, a more particular description of the invention will be rendered by reference to specific embodiments thereof which are illustrated in the appended drawings. It is appreciated that these drawings depict only example embodiments and are therefore not to be considered limiting of the scope of the invention. The example embodiments will be described and explained with additional specificity and detail through the use of the accompanying drawings in which.

DETAILED DESCRIPTION OF SEVERAL EMBODIMENTS

The principles of the embodiments described herein describe the structure and operation of several examples used to illustrate the present invention. It should be understood that the drawings are diagrammatic and schematic representations of such example embodiments and, accordingly, are not limiting of the scope of the present invention, nor are the drawings necessarily drawn to scale. Well-known devices and processes have been excluded so as not to obscure the discussion in details that would be known to one of ordinary skill in the art.

Figure 1:
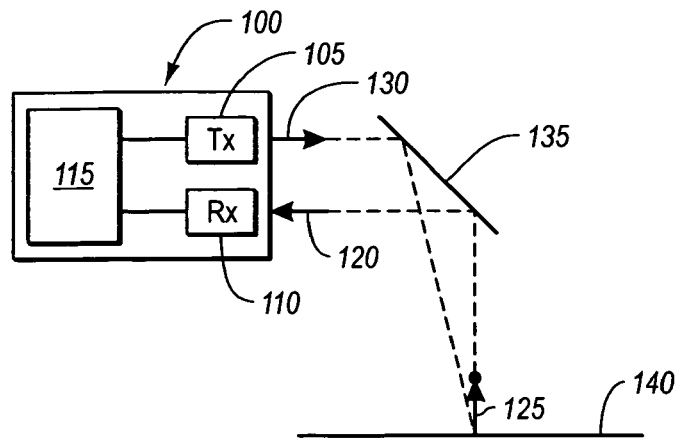
FIG. 1 illustrates a time of flight measurement apparatus according to an example embodiment.

Referring to FIG. 1, a time of flight measurement apparatus 100, such as a laser scanning or LIDAR system, is illustrated. The time of flight measurement apparatus 100 includes an optical transmitter 105, such as a laser, and an optical receiver 110, such as a photodiode. The optical transmitter 105 and optical receiver 110 are electrically coupled to circuitry 115. A first pulse of light 120 is emitted by the optical transmitter, is reflected off of a surface 140, and is received by the optical receiver 110 as shown in FIG. 1. After the first pulse of light 120 is transmitted, but prior to the first pulse of light 120 being received by the optical receiver 110, a second pulse of light 125 is transmitted by the optical transmitter 105. After a reflected portion of the first pulse of light 120 is received by the optical receiver 110 a reflected portion of the second pulse of light 125 will be received by the optical receiver 110. Additional pulses of light can be transmitted prior to the optical receiver 110 receiving the reflected portion of the first pulse of light 120 or the second pulse of light 125. For example, a third pulse of light 130 can be transmitted by the optical transmitter 105 prior to or simultaneously with the time that the reflected portion of the first pulse of light 120 is received by the optical receiver 110. Therefore, during operation, multiple pulses of light, e.g. three, four, or more pulses of light, may be simultaneously in-flight between the optical transmitter 105 and the optical receiver 110. As a result, the number of pulses of light in a given amount of time and corresponding range measurements may be increased over conventional systems.

This feature is of great benefit, particularly when vehicles carrying time of flight measurement apparatuses are flying at higher altitudes, where the time of flight of any individual laser pulse ordinarily limits the maximum pulse rate that can be obtained. This impact can be significant. For example, the speed of light limits the maximum pulse rate for a system capable of only serial-ranging operation to approximately 18 kHz at an altitude of 6000 m above ground level (AGL), while 150+kHz can be obtained at altitudes below 500 m AGL. The result of the invention is that the flying height for a given laser pulse rate can be doubled, tripled, etc (depending on the number of pulses being handled simultaneously) or, vice versa, the maximum pulse rate for a given flying height can be doubled, tripled, etc.

The circuitry 115 can include elapsed time circuitry configured to measure a time between transmission of the first pulse of light 120 by the optical transmitter 105 and reception of a reflected portion of the first pulse of light 120 by the optical receiver 110. The circuitry 115 can further include a data processing device configured to calculate a distance traveled by the reflected portion of the first pulse of light 120. For example, the elapsed time between the transmission of the first pulse of light 120 and reception of the reflected portion of the first pulse of light 120 received by the optical receiver 110 indicates the distance from the time of flight measurement apparatus 100 to the surface 140 according to the following equation:

$$\text{Distance} = (\text{Speed of Light} \times \text{Elapsed Time})/2 \quad \text{Equation 1}$$

In the instance that a pulse is transmitted at an angle to the surface 140, the angle can be measured and the perpendicular distance between the time of flight measurement apparatus 100 and the surface 140 (i.e., slant range) at the point of reflection can be calculated using known trigonometry equations. A scanning subassembly 135, such as a mirror, prism, holographic optic, or pointing device (e.g. a gimbal) for example, can be used to direct the pulses of light 120, 125, and 130 toward the surface 140. An angle at which the scanning subassembly 135 directs the pulses of light 120, 125, and 130 can be varied such that the pulses of light 120, 125, and 130 are directed to different locations of the surface 140. The angle at which the scanning subassembly 135 directs the pulses of light 120, 125, and 130 can be measured to provide a scan angle. Alternately, a 2D LIDAR detection array with time of arrival output can also be used in combination with lenses and/or holographic elements to result in a measurement of the angle at which the reflection is received. The scanning subassembly 135 is not necessary in various embodiments and may be excluded from the time of flight measurement apparatus 100.

The circuitry 115 can further include timing circuitry coupled to the optical transmitter 105 and to the optical receiver 110 to establish time of flight for each pulse of light 120, 125, and 130. The timing circuitry can be configured to sample electronic signals from the optical receiver 110 during a time interval approximating a time during which the reflected portions of the pulses of light 120, 125 and 130 are expected to be received. The time interval can be approximated where the distance between the time of flight measurement apparatus 100 and the surface 140 is known or can be estimated. For example, when the time of flight measurement apparatus 100 is directing pulses of light to different parts of the surface 140 and a highest and lowest point of the surface 140 is known, or can be estimated, the elapsed time between transmission and reception of a pulse of light can be approximated. Thus, signals from the optical receiver 110 need only be sampled during this time period.

Figure 2:
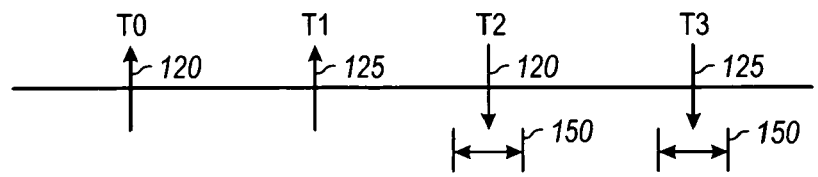
FIG. 2 illustrates a method for transmitting and receiving signals in a time of flight measurement apparatus.

For example, referring to FIG. 2, a method for transmitting and receiving signals in a time of flight measurement apparatus is illustrated. The first pulse of light 120 is transmitted at time T0. After the first pulse of light 120 is transmitted at time T0, but before the reflected portion of the first pulse of light 120 is received, a second pulse of light 125 is transmitted at time T1. After the second pulse of light 125 is transmitted at time T1, a reflected portion of the first pulse of light 120 is received at time T2. As described above, where the distance between a ranging system and a surface is known or can be estimated, it may not be necessary to sample a signal from the optical receiver continuously. Rather, the optical receiver can be sampled during particular intervals 150 (which may also be referred to as "range gates" or "sampling gates") during which the signals are expected to be received. Moreover, in some instances a return signal may not be received, for example where the pulse of light is directed away from the optical receiver. In this instance, the signal will not be received in the interval 150 and the likelihood of mistaking noise, interference, or another signal for the return signal can be minimized.

Any method for associating the signals received with the signals transmitted can be implemented. For example, the signals can be modulated, polarized, and/or sent having differing wavelengths. The signals can be modulated in order to use the modulation of the signal to associate the transmitted signals with the received signals. The signals can be modulated in amplitude, phase, and/or frequency to associate the received signals with the transmitted signals. For example, referring to FIG. 2, signal 120 can be modulated with a first amplitude, phase, and/or frequency and signal 125 can be modulated with an amplitude, phase, and/or frequency different from signal 120. Thus, return signals 120 and 125 received at T2 and T3 can be associated with their transmitted signals sent at T0 and T1 based on the transmitted and received signals' modulation.

Polarization of the signals may also be implemented to associate transmitted signals with received signals. For example, referring to FIG. 2, signal 120 can have a first polarization and signal 125 can have a different polarization than signal 120. Thus, return signals 120 and 125 received at T2 and T3 can be associated with their transmitted signals sent at T0 and T1 based on the transmitted and received signals' polarization.

Signals having different wavelengths can also be implemented to associate transmitted signals with received signals. For example, referring to FIG. 2, signal 120 can have a first wavelength and signal 125 can have a different wavelength than signal 120. Thus, return signals 120 and 125 received at T2 and T3 can be associated with their transmitted signals sent at T0 and T1 based on the transmitted and received signals' wavelength.

With cross-reference to FIGS. 1 and 2, the circuitry 115 can measure the elapsed time between transmission and reception of the pulses of light 120, 125, and 130. For example, the circuitry 115 can determine the time of flight of the first pulse of light 120 by measuring the elapsed time between the time when the first pulse of light 120 is transmitted at time T0 and the time when the reflected portion of the first pulse of light 120 is received at time T2 (i.e. T2-T0). Similarly, the circuitry 115 can determine the time of flight of the second pulse of light 125 by measuring the elapsed time between the time at which the second pulse of light 125 is transmitted at time T1 and when the reflected portion of the second pulse of light 125 is received at time T3 (i.e. T3-T1). The circuitry 115 can also include sampling electronics that can continuously record samples received from the receiver 110 along with timing information, such as timestamps, and record the samples along with the timing information for post-processing. The recorded information can be stored and subsequently processed to determine the association between the received pulses and the transmitted pulses and thus derive the distances and/or surface models from the recorded information.

Sampled data can further include waveforms (i.e. intensity profiles). The circuitry 115 can further include an intensity waveform recording device and/or a peak intensity recording device. Any of the devices discussed herein, or other devices known to be commonly combined with a time of flight measurement device or certain application, can be combined into a single device with the embodiments disclosed herein. One embodiment of the waveform recording device may be considered similar to an oscilloscope along with a digital sampling device. The waveform recording device can include circuitry 115 that receives samples from the receiver 110 and records waveform information for real-time analysis and/or post-processing. The intensity recording device can also include circuitry 115 that receives samples from the receiver 110 and records intensity information for real-time analysis and/or post-processing.

Embodiments illustrated herein can also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired data and program code means in the form of computer-executable instructions or data structures and which can be accessed by a general purpose, special purpose computer or other data processing device. Computer-executable instructions include, for example, instructions and data which cause a general purpose computer, special purpose computer, or other data processing device to perform a certain function or group of functions.

The circuitry 115 can include a data processing device for executing instructions stored in memory, for performing calculations, storing and retrieving data from memory, and for performing other tasks described herein. For example, the circuitry 115 can include a conventional or special purpose computer or other data processing device having a data processor, memory, and a user interface.

Figure 3:
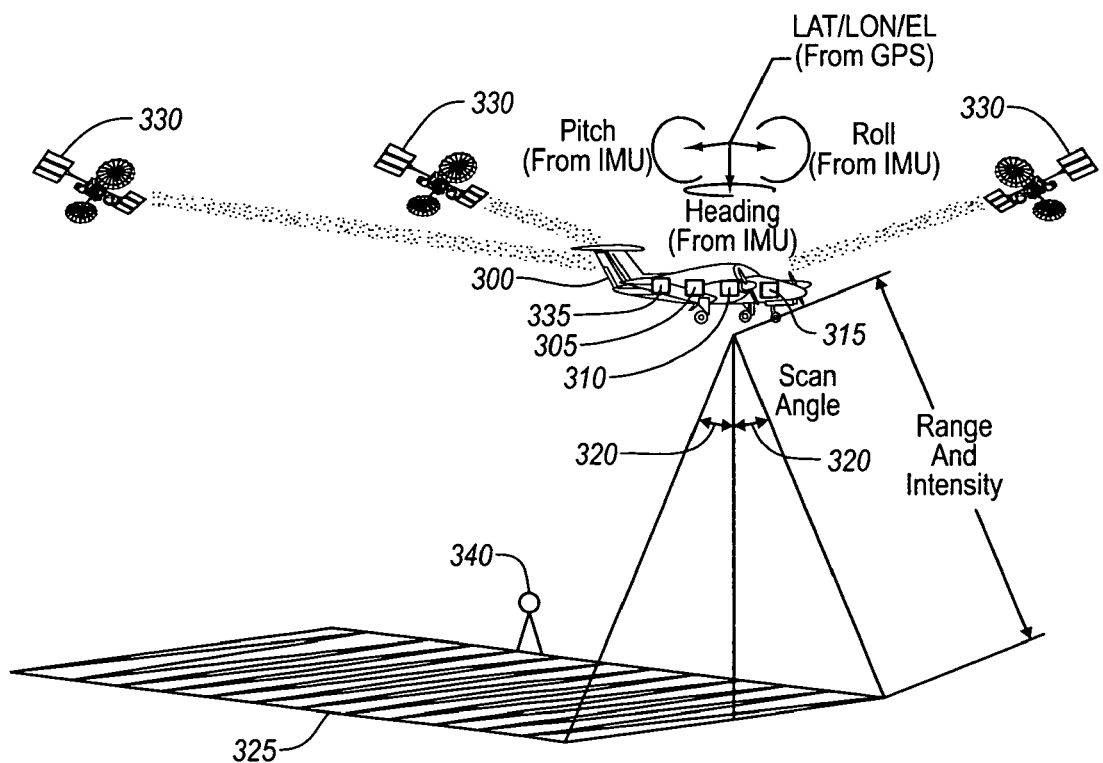
FIG. 3 illustrates a system for collecting topographical information.

Referring to FIG. 3, a time of flight measurement apparatus is illustrated including a system for collecting topographical information. The system includes an aircraft 300 type of vehicle carrying a LIDAR 305, a GPS 310 type of position measurement unit, and an IMU 315 type of orientation measurement unit. The LIDAR 305 is configured to emit at least one subsequent pulse of light prior to receiving a reflected portion of a previously emitted pulse of light, for example see FIGS. 1 and 2. The pulses of light emitted from the LIDAR 305 can be emitted at scan angles 320 so as to take range and/or intensity measurements over a portion of a surface 325. The portion of the surface 325 sampled can relate to a scan angle 320 of the LIDAR 305. The scan angle 320 of the LIDAR 305 can be taken into account to determine the contours of the surface 325 and produce a subsequent data model, such as a point cloud, DSM, or DTM, from the data acquired using known trigonometry equations. The LIDAR 305 can yield details under tree cover, "see" at night, and orthorectify imagery (with software).

The GPS 310 can receive signals from multiple satellites 330 and calculate positional data from the signals received from the satellites 330. The GPS can include any position measurement device. The positional data can include latitude, longitude, and elevation data describing a position of the aircraft 300 at a given point in time. The IMU 315 can measure changes in attitude of the aircraft 300 and can include any orientation measurement device. For example, the IMU 315 can measure changes in pitch, roll, and heading of the aircraft 300.

The aircraft can include circuitry 335 for processing the data received from the LIDAR 305, GPS 310, and/or IMU 315 to create a high spatial resolution data model describing the surface 325. For example, as the aircraft 300 flies across a project area including the surface 325, pulses of light are emitted toward the ground at a high rate with multiple pulses of light in-flight at one time. These pulses of light are reflected by the surface 325 and/or objects upon the surface 325, such as trees and buildings. For each pulse of light, the elapsed time between the emitted and returning signal is measured, which enables a distance to be computed. At the same time, the position and attitude of the aircraft 300 are measured with the airborne GPS 310 and IMU 315. A GPS ground reference station 340 may also be used for increased accuracy.

In addition to recording the round-trip elapsed time of the pulses of light, the intensity of the returned reflections can also be recorded. The intensity information can be mapped in the form of a graphical plot, generated by a process similar to that of an orthophoto. Where a pulse of light encounters more than just the surface 325 it may be reflected by additional objects, such as power cables and trees for example. Additional return signals can be recorded for each pulse of light, generating information about the area sampled. Post processing firmware and/or software implemented in the aircraft, or after a data gathering mission, can also combine the aircraft trajectory and pulse of light scan data to calculate ground coordinates of the data points and transform, if required, to the projection and datum preferred by a user. The handling of time interval measurements from multiple laser pulses propagating through the atmosphere simultaneously is not limited to detection of discrete single or multiple return reflection pulses occurring during a time interval (e.g. see time interval 150 in FIG. 2). The advantages of handling multiple pulses also accrue to systems that record the entire return signal waveform (e.g., for return reflection 120, 125, 130 in FIG. 2) that may exist during any time interval.

Post processing firmware and/or software can combine the data received from the LIDAR 305, GPS 310, and IMU 315 with information describing atmospheric conditions, hardware characteristics, and other relevant parameters, to generate a series of XYZ coordinate triplets (optionally with return signal intensity data) for points on the ground. As a data gathering mission progresses, millions of such points can be captured, providing a DTM.

Figure 4:
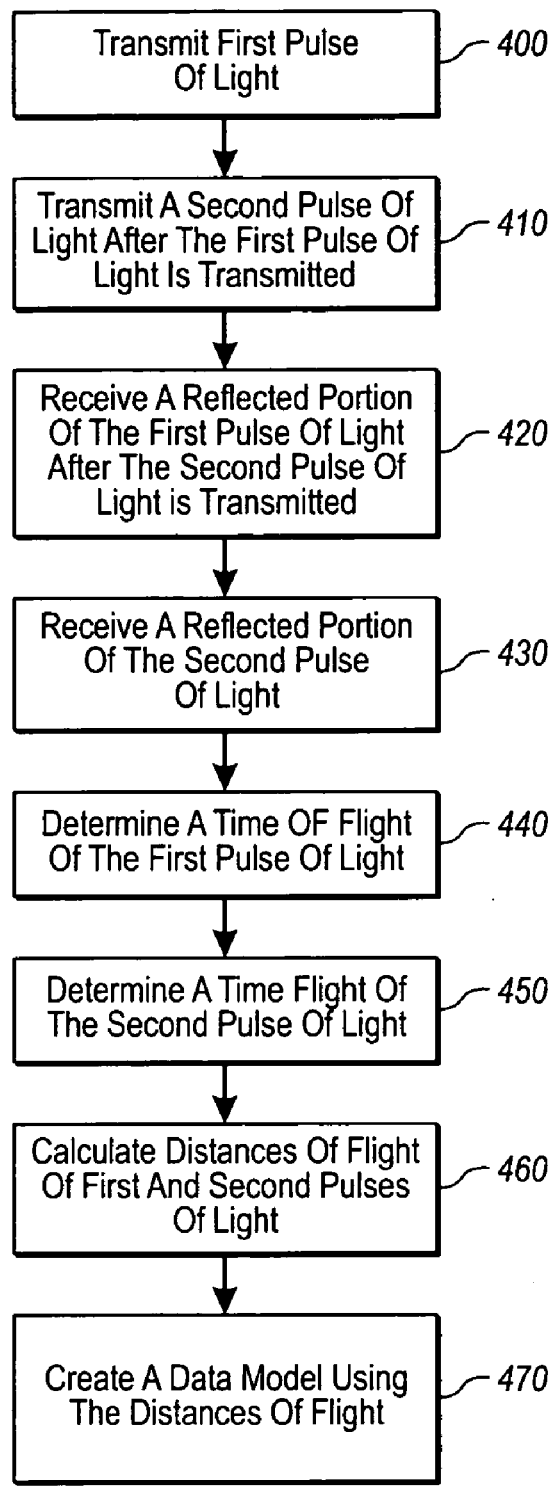
FIG. 4 illustrates a method for acquiring data describing terrain.

Referring to FIG. 4, a method for acquiring data describing a surface, such as a surface of an object or a terrain surface, is illustrated. The method includes transmitting a first pulse of light (400). The first pulse of light can be transmitted by a laser and can have a certain trajectory and scan angle toward the surface. A second pulse of light is transmitted after the first pulse of light is transmitted (410). The second pulse of light can be transmitted by the same laser as the first pulse of light or the second pulse of light can be transmitted by a different laser than the first pulse of light in any of the embodiments disclosed herein. The second pulse of light can have a different trajectory and scan angle than the first pulse of light and be directed toward a different location of the surface. A reflected portion of the first pulse of light is received after the second pulse of light is transmitted (420). Thus, at least the first and second pulses of light are simultaneously "in-flight" prior to the first pulse of light being received. Additional pulses of light can be transmitted and the embodiments disclosed herein are not limited to only two pulses of light "in-flight" at one time. Thus, three, four, or more pulses of light may be "in-flight" at one time and may be transmitted by the same or different lasers and reflected portions of the transmitted light pulses may be received by the same or different receivers. The pulses of light can have different wavelengths, can be modulated and/or polarized to associate the received signals with the transmitted signals. Sampling of the receiver(s) can be conducted during certain intervals (i.e. gates) as discussed above with reference to FIG. 2.

A reflected portion of the second pulse of light is received (430). A time of flight of the first pulse of light is determined (440). The time of flight of the first pulse of light can be determined by measuring the time elapsed between the transmission of the first pulse of light and the time of reception of the reflected portion of the first pulse of light. A time of flight of the second pulse of light can also be determined (450). The time of flight of the second pulse of light can be determined by measuring the time elapsed between the transmission of the second pulse of light and the time of reception of the reflected portion of the second pulse of light. A distance of travel for the first and second pulses of light can be calculated using the time of flight of each pulse of light (460). For example, the distance of travel by each pulse of light can be calculated using Equation 1 above. A data model, such as a point cloud, DSM, or DTM, can be created using the distances of flight (470). The data model can account for slant angles of the first and second pulses of light and include data received from additional pulses of light, for example millions of pulses of light may be used to create the data model.

The pulses of light can be transmitted using a laser and the reflected portions of the pulses of light can be detected using a detector such as an avalanche photodiode, PIN photodiode, a photomultiplier, a channel multiplier, a vacuum diode, an imaging array with time-of-arrival output, or any other type of detector known to one of ordinary skill in the art. The detector can be sampled during certain time periods, where the time periods have a timing and duration that is calculated based at least in part on a maximum and minimum distance between the aircraft and the surface being sensed. For example, where the highest point of the ground over which the an aircraft is flying is 700 feet and the lowest point is 0 feet above sea level, the timing and duration of the sampling time period can be estimated. The expected time that the return portion of the pulse will be received is based at least in part on the speed of light and the range of altitudes of the aircraft above the ground.

The laser and receiver can be part of a laser ranging system, for example see FIGS. 1 and 2, and the laser ranging system can produce electronic signals describing the transmission and reception of pulses of light. Additional information can be received from a GPS and IMU describing position and attitude of a vehicle, such as the aircraft shown in FIG. 3, in which the LIDAR, GPS, and IMU are being carried. A point cloud or DTM can be created based at least in part on the data received from the LIDAR, GPS, and IMU.

While apparatuses discussed herein have been described in conjunction with applications for gathering information describing surfaces of objects and terrain, it should be appreciated that the apparatuses can be used in various other applications, such as but not limited to, seismology, detecting faults, biomass measurement, wind speed measurement, temperature calculation, traffic speed measurement, military target identification, atmospheric research, meteorology, distance measurement, as well as many other applications.

A time of flight measurement device apparatus according to the teachings herein can include a laser scanner, such as the laser scanner disclosed in U.S. Pat. No. 6,734,849, the contents of which have been incorporated by reference herein. A laser scanner, such as that disclosed in U.S. Pat. No. 6,734,849 can be used to collect points to form a point cloud by transmitting a first pulse of light prior to a second pulse of light wherein the second pulse of light is transmitted prior to a time at which a reflected portion of the first pulse of light is received by an optical receiver of the laser scanner. A computer can display the points as the point cloud on a display, including such devices as a monitor, a projection screen, and stereo glasses. By displaying the points, the computer assigns pixel values based on instructions from software according to well-known principles. Each point in the point cloud can represent the distance in a real scene from a point on a surface of an object in the scene to the laser scanner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A time of flight measurement apparatus comprising:
one or more lasers each configured to transmit light;
an optical receiver configured to receive light;
laser control circuitry configured to cause the one or more lasers to transmit a first pulse of light prior to a second pulse of light, the laser control circuitry further configured to cause the one or more lasers to transmit the second pulse of light prior to a time at which a reflected portion of the first pulse of light is received by the optical receiver; and
elapsed time circuitry configured to measure an elapsed time between transmission of the first pulse of light by the laser and reception of the reflected portion of the first pulse of light by the optical receiver,
wherein the first and second pulses of light are of the same frequency but are otherwise distinguishable when received by the apparatus.

2. A time of flight measurement apparatus according to claim 1, further comprising:
a data processing device configured to calculate a distance between the apparatus and a surface based at least in part on the elapsed time.

3. A time of flight measurement apparatus according to claim 1, further comprising sampling electronics configured to receive characteristics of a discrete return reflection pulse, multiple reflection pulses, or an entire return reflection pulse waveform from the optical receiver.

4. A time of flight measurement apparatus according to claim 1, wherein the laser control circuitry is further configured to cause the laser to transmit at least one additional pulse of light after the first pulse of light is transmitted but prior to the time at which the reflected portion of the first pulse of light is received by the optical receiver.

5. A time of flight measurement apparatus according to claim 1, wherein the elapsed time circuitry is further configured to calculate a time between transmission of the second pulse of light by the laser and reception of a reflected portion of the second pulse of light by the optical receiver, wherein the reflected portion of the first pulse of light is received by the optical receiver prior to the reception of the reflected portion of the second pulse of light by the optical receiver.

6. A laser ranging system comprising a time of flight measurement apparatus according to claim 1, the laser ranging system further comprising:
at least one of, or any combination of, the members of a set consisting of:
a vehicle supporting the laser ranging system;
a position measurement unit;
an inertial measurement unit; and
a scanning subsystem.

7. A laser scanner comprising the time of flight measurement apparatus set forth in claim 1.

8. A time of flight measurement apparatus according to claim 1, further comprising:
timing circuitry coupled to the optical receiver, the timing circuitry configured to sample electronic signals from the optical receiver during a first time interval, the first time interval approximating a time during which the reflected portion of the first pulse of light is estimated to be received by the optical receiver based at least in part on a range of distances from the laser ranging system to the surface and a scan angle of the first pulse of light.

9. A time of flight measurement apparatus according to claim 8, wherein the timing circuitry is further configured to sample electronic signals from the optical receiver during a second time interval approximating a time during which the reflected portion of the second pulse of light is estimated to be received by the optical receiver based at least in part on the range of distances from the laser ranging system to the surface and a scan angle of the second pulse of light.

10. A time of flight measurement apparatus according to claim 1, further comprising:
a scanning subassembly configured to direct the first and second pulses of light transmitted by the laser at different scan angles.

11. A time of flight measurement apparatus according to claim 1, wherein the laser control circuitry is further configured to distinguish the first and second pulses by amplitude modulating the first pulse differently from the second pulse.

12. A time of flight measurement apparatus according to claim 1, wherein the laser control circuitry is further configured to distinguish the first and second pulses by phase modulating the first pulse differently from the second pulse.

13. A time of flight measurement apparatus according to claim 1, wherein the laser control circuitry is further configured to distinguish the first and second pulses by polarizing the first pulse differently from the second pulse.

14. A method performed by a LIDAR system including at least one laser for transmitting light and at least one receiver for receiving light reflected from a surface, the LIDAR system being configured for acquiring data describing the surface, the method comprising:
transmitting a first pulse of light at a first scan angle;
transmitting a second pulse of light after the first pulse of light is transmitted at a second scan angle that differs from the first scan angle;
receiving a reflected portion of the first pulse of light after the second pulse of light is transmitted; and
determining a time of flight of the first pulse of light by determining an elapsed time between the transmission of the first pulse of light and the time of reception of the reflected portion of the first pulse of light,
wherein the first and second pulses of light are of the same frequency.

15. A method according to claim 14, further comprising:
receiving a reflected portion of the second pulse of light after the reflected portion of the first pulse of light is received; and
determining a time of flight of the second pulse of light including determining a time between the transmission of the second pulse of light and a time of reception of the reflected portion of the second pulse of light.

16. A method according to claim 14, further comprising:
calculating a distance of travel of the first pulse of light; and
calculating a distance of travel of the second pulse of light.

17. A method according to claim 14, wherein the pulses of light are transmitted using a laser.

18. A method according claim 14, further comprising modulating or polarizing the first pulse of light.

19. A method according to claim 18, further comprising associating the reflected portion of the first pulse of light with the transmitted first pulse of light based on the modulation or polarization of the reflected portion of the first pulse of light.

20. A method according to claim 18, further comprising modulating or polarizing the second pulse of light differently than the first pulse of light.

21. A method according to claim 14, wherein the pulses of light are transmitted by a laser imaging detection and ranging (LIDAR) system, the method further comprising:
receiving a signal from the LIDAR describing a time of flight of the first pulse of light;

receiving a signal from a global positioning system (GPS) describing a position of a vehicle in which the LIDAR unit and GPS are carried; and receiving a signal from an inertial measurement unit (IMU) describing changes in attitude of the vehicle.

22. A method according to claim 21, further comprising:

creating a digital terrain model (DTM) based at least in part on the information received from the LIDAR, GPS, and IMU.

23. A method according to claim 14, further comprising:

creating a digital terrain model (DTM), a digital surface model (DSM), or a point cloud model describing the surface.

24. A computer readable medium having computer executable instructions stored on the computer readable medium, the computer executable instructions configured to cause a computer to create the DTM, DSM, or point cloud model of claim 23.

25. A method according to claim 14, further comprising:

recording information describing a discrete return reflection pulse, multiple reflection pulses, or an entire return reflection pulse waveform in a computer readable medium.

26. A method according to claim 14, further comprising:

performing analysis of a waveform of a reflected portion of the first pulse of light.

27. A method according to claim 14, further comprising:

mapping terrain, performing bathymetry, performing seismology, detecting faults, measuring biomass, measuring wind speed, taking ozone measurements, calculating temperature, measuring traffic speed, identifying a target, performing surface to air rangefinding, surveying, performing close range photogrammetry, analyzing the atmosphere, performing meteorology, or measuring distance.

28. Circuitry configured to control the transmission of light by at least one laser according to the method of claim 14.

29. A method according to claim 14, wherein the reflected portions are sampled during predetermined time periods, wherein the duration and timing of the predetermined time periods are calculated based at least in part on a maximum and minimum distance between an aircraft and the ground below the aircraft and the first and second scan angles.

* * * * *